Dec. 27, 1966   A. RECULE ET AL   3,294,642

CONTAINER FOR SAMPLES TO BE IRRADIATED

Filed May 14, 1964   3 Sheets-Sheet 1

INVENTORS
ALBERT RECULE
PAUL THOME
BY Bacon & Thomas
ATTORNEYS

INVENTORS
ALBERT RECULE
PAUL THOME

Dec. 27, 1966  A. RECULE ET AL  3,294,642

CONTAINER FOR SAMPLES TO BE IRRADIATED

Filed May 14, 1964  3 Sheets-Sheet 3

INVENTORS
ALBERT RECULE
PAUL THOME

BY Bacon & Thomas

ATTORNEYS

United States Patent Office 3,294,642
Patented Dec. 27, 1966

3,294,642
CONTAINER FOR SAMPLES TO BE IRRADIATED
Albert Recule, Igny, and Paul Thome, Saint-Cloud, France, assignors to Commissariat a l'Energie Atomique, Paris, France
Filed May 14, 1964, Ser. No. 367,348
Claims priority, application France, May 31, 1963, 936,758
7 Claims. (Cl. 176—15)

The present invention has for its object a container for samples to be irradiated which is intended to be introduced in a nuclear reactor channel.

Containers for samples to be irradiated are already known in which the external shape is similar to that of a fuel element or group of fuel elements and which can consequently be positioned within the lattice of a nuclear reactor in lieu of a fuel element or group of fuel elements.

However, the use of containers of this type for irradiation tests gives rise to a certain number of difficulties by reason of the fact that the person conducting experiments is unable to exercize control over the radiation which is emitted by the independent operation of the reactor, or even in many cases over the flow rate of coolant fluid which circulates through the channels of a reactor.

Moreover, it is frequently impossible to bring "in situ" either thermo-couples, resistors or like units for purposes of measuring or checking.

When it is desired to check a whole series of parameters, it usually proves necessary to operate in loops in which all the control units are assembled together outside the reactor. Such tests are very costly and time-consuming.

The main object of the present invention is to overcome the disadvantages referred-to above.

To this end, the invention relates to a container for samples to be irradiated which can be substituted within the lattice of a nuclear reactor for either a fuel element or a group of fuel elements, characterized in that said container comprises a chamber which is intended to accommodate the sample and means for regulating the temperature prevailing within said chamber, said means forming one piece with said container and comprising temperature-correcting means, a source of energy for supplying said temperature-correcting means and means for checking the temperature.

Reference being made to FIGS. 1 to 6 of the accompanying drawings, there will now be described below a number of particular forms of embodiment of the container in accordance with the invention, said forms of embodiment having been chosen solely by way of example without implied limitation.

Figure 1:
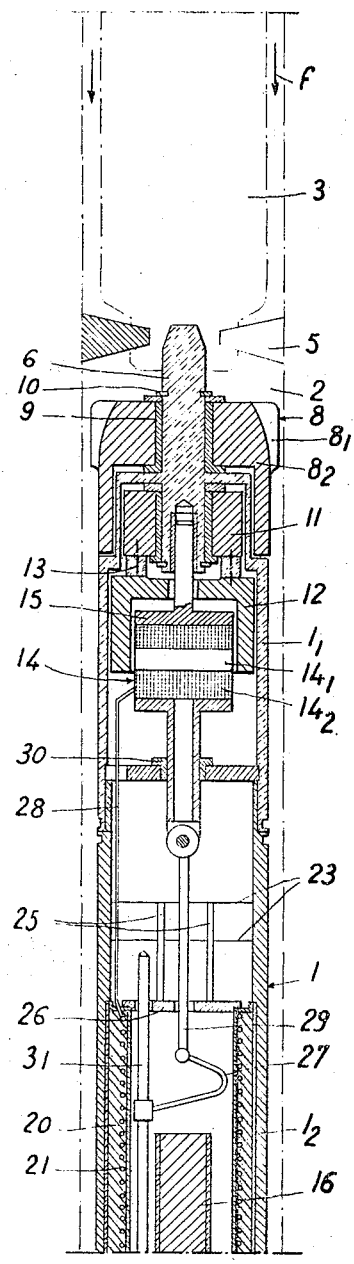
FIGS. 1 and 2 are front sectional views respectively of the top portion and bottom portion of a container according to the invention as shown in position within a nuclear reactor channel.
Figure 2:
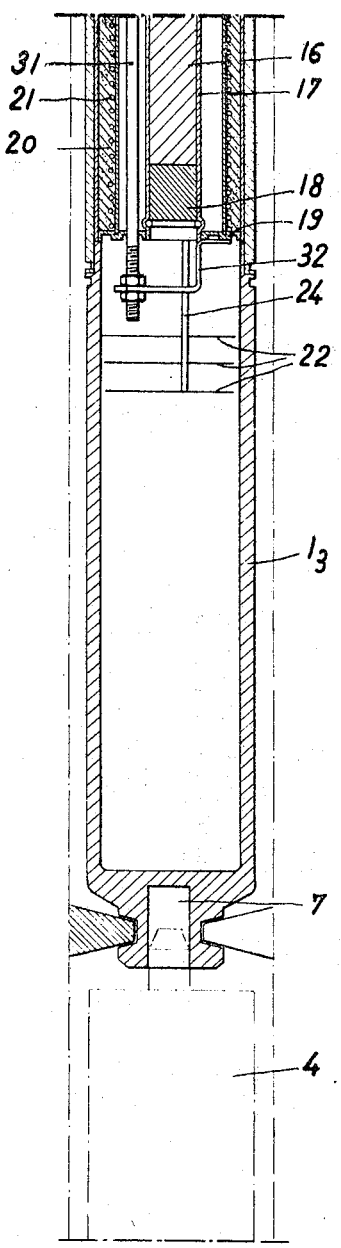

In accordance with the invention, the container which is illustrated in FIGS. 1 and 2 comprises a body 1 having an external shape which is similar to that of a fuel element or of a group of fuel elements constituting the core of a nuclear reactor. Especially as shown in the drawings, the container body 1 can be made up of three components $1_1$, $1_2$ and $1_3$ which are fitted together and welded. In FIGS. 1 and 2, the container is shown in position within a reactor channel 2 between two standard fuel elements 3 and 4. The container as well as the standard fuel elements 3 and 4 which are supported within the channel by lugs 5 forming projections from the channel wall are centered with respect to each other by means of a stud 6 which is provided on the head of each container or fuel element, there being formed at the other extremity of each container or fuel element a recess 7 which is intended to accommodate the stud 6 of an immediately adjacent container or fuel element.

The container which is illustrated in FIGS. 1 and 2 is provided at one end with a turbine-wheel 8 which is provided with fins $8_1$ and with a magnetic head portion $8_2$. Said turbine-wheel 8 is adapted to rotate, under the action of the thermal fluid which circulates through the channel 2 within which the container is placed (the direction of circulation of the fluid being indicated by the arrows $f$), around a ring 9 which is held in position around the stud 6 by means of a snap-ring 10, and drives a magnetic rotor 11 through the head $1_1$ of the container body.

The rotor 11 which is located within the container body 1 is coupled to a U-shaped permanent magnet 12 through the intermediary of a ring 13 which performs the function of a magnetic insulator.

The permanent magnet 12 is adapted to rotate about a coil 14 consisting of a core $14_1$ and a winding $14_2$ which are mounted within a support 15, the combined assembly which consist of said coil 14 and said permanent magnet 12 being designed to constitute a dynamo, the function of which will be described later.

The sample which is designated by the reference 16 is placed within a casing 17 which is supported by an insulating cap 18 on a mounting-plate 19 which in turn bears on the container body 1. The plate 19 also supports a thermal insulation unit 20 and a fine-adjustment resistor 21 which are coaxial with the container body 1.

Provision is made on each side of the sample 16 for a plurality of screens 22 and 23 which are secured respectively by means of rods 24 and 25 to the mounting-plate 19 and to the top plate 26, the said screens being intended to form with the internal wall of the container a chamber which is intended to accommodate the sample 16, the insulation unit 20, the fine-adjustment resistor 21 and the means for measuring the ambient temperature within said chamber. The temperature-measuring means preferably consist as shown in FIGS. 1 and 2 of a bi-metallic strip 27 which is disposed in proximity to the sample 16.

In the form of embodiment of FIGS. 1 and 2, the fine-adjustment resistor 21 is coupled electrically through a conductor 28 to the coil 14, the continuous regulation of the current supplied to the fine-adjustment resistor 21 being carried out by modifying the current intensity as a function of the temperature. For this purpose, the coil 14 is movably mounted relatively to the permanent magnet 12 and the movements carried out with respect to said magnet are controlled in dependence on the displacements of one of the extremities of the bimetallic strip 27.

The mechanical coupling between the support 15 of the coil 14 and the bimetallic strip 27 is provided by a connecting-rod 29, the movements of the support 15 and therefore those of the coil 14 being guided by a bearing 30.

The bimetallic strip 27 is preferably attached to a rod 31, the preselection of the temperature at which the coil 14 is intended to move being carried out by adjusting said rod on a right-angle bracket 32 which is secured to the mounting-plate 19, the effect thereby achieved being to permit the possibility of establishing at the outset the intensity of the fine-adjustment current which is to be delivered through the coil 14 to the resistor 21.

In the container which is illustrated in FIGS. 1 and 2, provision is thus made for means such as the bimetallic strip 27 for the purpose of checking the ambient temperature within the chamber which contains the sample 16, means for regulating said temperature such as the resistor 21 and power-generating means such as the dynamo 14–15 for the purpose of ensuring the operation of the regulating means. The dynamo 14–15 is continuously driven by the turbine-wheel 8 which is set in motion by the cooling fluid which circulates through the reactor channel within which the container is located.

Figures 3, 4:
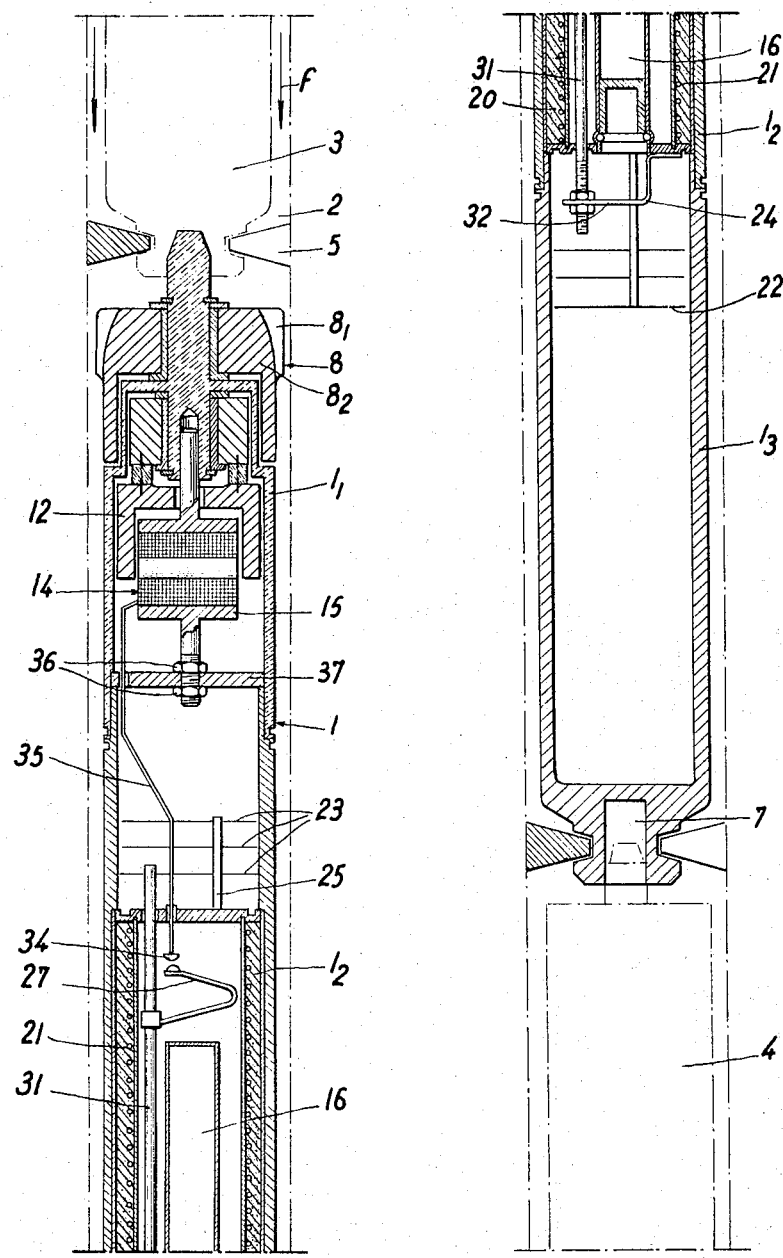
FIGS. 3 and 4 are front sectional views respectively of the top portion and bottom portion of an alternative form of container of FIGS. 1 and 2.

An alternative form of the container in accordance with the invention is illustrated in FIGS. 3 and 4 wherein the components which have already been described in reference to FIGS. 1 and 2 are designated by the same reference numerals. The container which is illustrated in FIGS. 3 and 4 differs essentially from that of FIGS. 1 and 2 in that the electrical connection between the coil 14 and the fine-adjustment resistor 21 is carried out in this case by means of the bimetallic strip 27 and a stationary contact 34, said contact being electrically connected to the coil 14 by means of a conductor 35. Such an arrangement permits of an all-or-nothing regulation by interrupting the current supply by means of the contact 34. This current interruption is carried out by the displacement of the bimetallic strip 27 which is mounted, as already described in connection with the form of embodiment of FIGS. 1 and 2, on a rod 31 which is so adjusted on the right-angle bracket 32 as to permit the possibility of preselecting the temperature within the chamber which contains the sample 16. In this alternative form of embodiment, the support 15 of the coil 14 is secured directly by means of two nuts 36 to a base 37 which bears on the container body 1.

Figure 5:
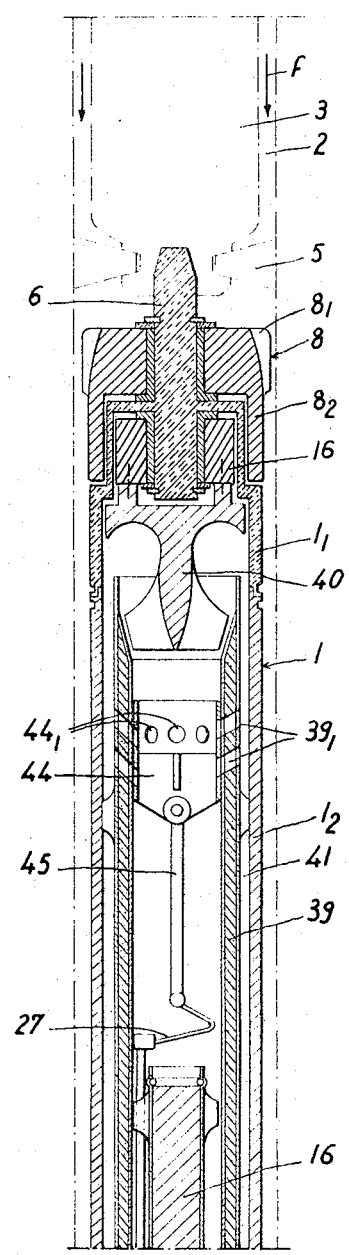
FIGS. 5 and 6 are front sectional views showing respectively the top portion and the bottom portion of another alternative form of the container of FIGS. 1 and 2.
Figure 6:
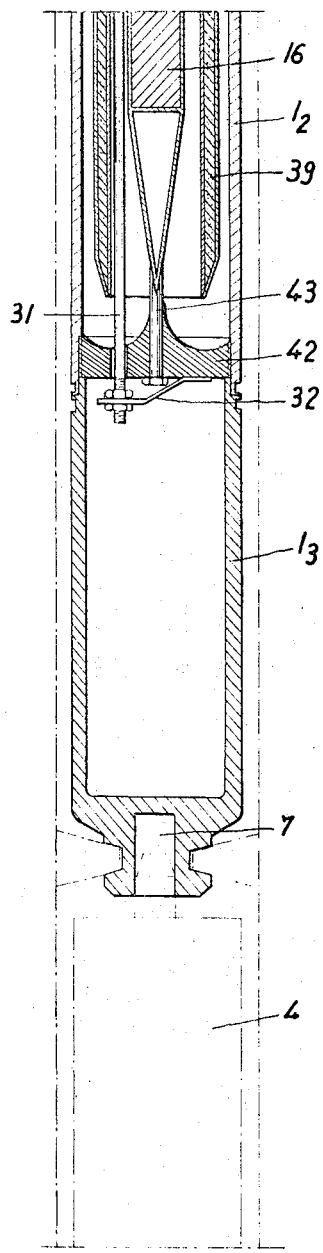

In a second alternative form of embodiment which is illustrated in FIGS. 5 and 6 (in which the components of the container which have already been described in reference to FIGS. 1 and 2 are given the same reference numerals), the temperature regulation is not carried out as in the previous forms of embodiment by means of a fine-adjustment resistor but on the contrary by a gas flow within the interior of the sample chamber. The heating of the sample 16 is carried out in this case by gamma radiation, the thermal equilibrium proper and the regulation being ensured on the one hand by means of a thermal insulation unit 39 and on the other hand by a gas flow within the sample chamber, that is to say by forced convection. This forced convection is achieved by means of a turbine-wheel 40 which is directly coupled to the magnetic rotor 16 which, as in the two preceding forms of embodiment, is driven in rotation by the movement of the magnetic portion 8₂ of the turbine-wheel 8 which is located externally of the container body 1.

As is shown in FIGS. 5 and 6, the thermal insulation unit 39 has the shape of a tube which is coaxial with the container body and disposed in such a manner as to form between the internal wall of the container body 1 and its own peripheral face an annular space 41 which permits the circulation of the gas contained in the chamber which is formed within said container for the purpose of accommodating the sample 16.

The aforesaid chamber is delimited within the container body 1 at the top portion thereof by the turbine-wheel 40 and at the bottom portion thereof by a deflector 42 which is disposed in the vicinity of the bottom portion of the insulating tube 39. The deflector 42 also performs the functnon of a base plate for the means 43 on which the sample 16 is supported and also serves to carry the bracket 32 on which is mounted the rod 31 which supports the bimetallic strip 27.

In this alternative form of embodiment which is illustrated in FIGS. 5 and 6, the regulation of the forced convection flow (that is to say the regulation of the temperature within the sample chamber) is carried into effect as a result of the displacement of a slide-valve 44 which is operated by the bimetallic strip by means of a connecting-rod 45.

The displacements of the slide-valve 44 which is accordingly provided with ports 44₁ in fact permit the possibility of working on the flow cross-section provided by the ports 39₁ which are formed in the insulating tube 39 and through which the flow of gas within said tube can be by-passed at least to a partial extent.

The gas is intended to flow over the sample 16 then into the annular space 41, the cooling of the gas being effected by bringing this latter into contact with the wall of the container body 1 which is cooled externally by the thermal fluid circulating within the reactor channel 2 in which said container is disposed.

It will be apparent that the invention is not limited to the forms of embodiment which have been described and illustrated.

It would be possible if necessary to have recourse to other forms of embodiment without thereby departing either from the scope or the spirit of the invention.

What we claim is:

1. A temperature-regulated sample container assembly to be positioned within a nuclear reactor core, in which a cooling fluid is circulated, for irradiating the sample, comprising: a closed container having a chamber for accommodating said sample, and means for regulating the temperature within said chamber, said means including a driven magnetic head located inside said closed container, a magnetic driving head located exteriorly of said container and coaxial with said driven head for magnetic coupling therewith, a turbine wheel rotatively mounted on the exterior surface of said container for actuation by said circulated cooling fluid, said magnetic driving head being securely connected with said turbine wheel for rotation therewith, means actuated by said magnetic driven head for modifying the temperature in said chamber, and means responsive to the temperature in said chamber for controlling said temperature modifying means.

2. A temperature-regulated sample container assembly in accordance with claim 1 wherein said means actuated by said driven magnetic head for modifying the temperature in said chamber is located within said container and includes an electrical resistor and an electric current generating dynamo, said dynamo comprising a coil and a magnet coaxially arranged; one of said coil and said magnet being securely connected with said driven magnetic head for rotation therewith, the other of said coil and said magnet being non-rotatively mounted in said container, said coil being operably connected with said electrical resistor, and wherein said means responsive to the temperature in said chamber is operable for controlling the current supplied by said dynamo to said electrical resistor.

3. A temperature-regulated sample container assembly in accordance with claim 2 wherein said magnet is securely connected with said driven magnetic head for rotation therewith and said coil is mounted in said container for axial movement relative to said magnet, and said means responsive to the temperature in said chamber is a bimetallic strip connected with said coil for moving said coil axially in response to temperature changes in said chamber for varying the electric current generated by said dynamo.

4. A temperature-regulated sample container assembly in accordance with claim 2 wherein said means responsive to the temperature in said chamber is a bimetallic strip responsive to temperature changes in said chamber for controlling the flow of current from said dynamo to said electrical resistor.

5. A temperature-regulated sample container assembly in accordance with claim 1 wherein the means responsive to the temperature in said chamber consist of a bimetallic strip.

6. A temperature-regulated sample container assembly in accordance with claim 1 wherein the means actuated by said magnetic driven head comprise a turbine-wheel located within said container and coupled to the magnetic rotor for producing a forced circulation of gas within the chamber.

7. A temperature-regulated sample container assembly in accordance with claim 6 wherein an insulating tube is disposed coaxially within the chamber surrounding said sample and forms a free annular space between said tube and the container walls, said tube being provided with ports so as to permit the distribution of the gas which circulates between said chamber and said annular space, and a slide-valve which is movable within said insulating tube for the purpose of either freeing or sealing off said ports and the movements of which are controlled by said means responsive to the temperature in said chamber.

References Cited by the Examiner

UNITED STATES PATENTS 3,087,886  4/1963  Robinson _____ 176—19

FOREIGN PATENTS 78,282  5/1962  France.
1,261,979  4/1961  France.
972,192  10/1964  Great Britain.

CARL D. QUARFORTH, *Primary Examiner.*

L. DEWAYNE RUTLEDGE, *Examiner.*

H. E. BEHREND, *Assistant Examiner.*